(12) United States Patent
Zohar et al.

(10) Patent No.: US 7,870,334 B2
(45) Date of Patent: Jan. 11, 2011

(54) DISTRIBUTED TASK QUEUES IN A MULTIPLE-PORT STORAGE SYSTEM

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/706,676

(22) Filed: Nov. 12, 2003

(65) Prior Publication Data

US 2005/0102469 A1 May 12, 2005

(51) Int. Cl.
*G06F 12/00* (2006.01)

(52) U.S. Cl. ................. 711/114; 711/149; 711/154; 710/39

(58) Field of Classification Search .......... None
See application file for complete search history.

(56) References Cited

U.S. PATENT DOCUMENTS

| | | | | |
|---|---|---|---|---|
| 5,832,304 A * | 11/1998 | Bauman et al. | ........... | 710/40 |
| 5,910,928 A * | 6/1999 | Joffe | ........... | 365/230.05 |
| 6,055,605 A * | 4/2000 | Sharma et al. | ........... | 711/130 |
| 6,181,595 B1 * | 1/2001 | Hawkins et al. | ........... | 365/156 |
| 6,209,059 B1 * | 3/2001 | Ofer et al. | ........... | 711/114 |
| 6,311,257 B1 * | 10/2001 | Fitzgerald et al. | ........... | 711/170 |
| 6,421,723 B1 * | 7/2002 | Tawil | ........... | 709/224 |
| 2001/0028524 A1 | 10/2001 | Hoskins | | |
| 2004/0054866 A1 * | 3/2004 | Blumenau et al. | ........... | 711/202 |
| 2004/0205297 A1 * | 10/2004 | Bearden | ........... | 711/133 |

FOREIGN PATENT DOCUMENTS

WO  03/062979 A2  7/2003

OTHER PUBLICATIONS

European Exam Report for corresponding European Patent Application No. 04 256 357.7, dated May 12, 2009.

* cited by examiner

*Primary Examiner*—Kaushikkumar Patel
(74) *Attorney, Agent, or Firm*—Griffiths & Seaton PLLC

(57) ABSTRACT

A storage system, consisting of one or more data storage logical units (LUs) formed in physical media. The LUs are adapted to receive command and respond to the commands to store and recall data. The storage system further includes a plurality of ports, each port being adapted to maintain a respective LU command queue for each of the LUs, such that upon receiving a command directed to one of the LUs, the port places the received command in the respective LU command queue. The port converts the received command to one or more converted commands at least some of which are directed to the physical media of the one of the LUs. The port then conveys the commands directed to the physical media in an order determined by the respective LU command queue.

20 Claims, 3 Drawing Sheets

DISTRIBUTED TASK QUEUES IN A MULTIPLE-PORT STORAGE SYSTEM

FIELD OF THE INVENTION

The present invention relates generally to storage systems, and specifically to storage systems comprising multiple ports.

BACKGROUND OF THE INVENTION

A storage system for one or more hosts typically comprises a number of ports via which data write or read requests are transferred to or from the hosts. The storage system consists of one or more logical volumes or units, and the data requests from the hosts are directed to these logical units via the ports. The logical units comprise non-volatile media wherein data of the storage system is stored, and since these non-volatile media typically have slow access times, one or more fast access time caches are normally interposed between the ports and the non-volatile media. The caches reduce bottlenecks that would be caused by the slow access time of the non-volatile media. Typically, each logical unit has its own command queue, wherein the data write and read requests, as well as other commands, are placed. Different requests and commands to a specific logical unit may arrive via different ports. However, the storage system needs to preserve the order of these different requests and commands to avoid inconsistencies accruing in the storage system. To preserve this order, the storage system typically uses a shared resource, such as one or more central shared memories, which monitors requests and commands arriving at the ports, and creates the command queues of the individual logical units.

U.S. Patent Application 20010028524 to Hoskins, whose disclosure is incorporated herein by reference, describes a method for selecting optimal command nodes (a data structure consisting of a number of fields which contain information necessary to carry out a command in a microprocessor). The method is implemented for a computing device by identifying a command node in a first queue and determining if the identified command node collides with a command node in a second queue. If a collision between the identified command node and a command node in the second queue is determined, the collision is corrected and the identified command node may then be moved into the second queue. The second queue is then sorted according to a predetermined routine to select the optimal command node.

As storage systems increase in size, the number of requests and commands also increases. Hence the number of ports which shared resources of the system have to monitor typically increases and the operation of the shared resources becomes more complex. The increasing complexity creates its own bottleneck, so that full scalability of ports is not achievable. A system which avoids the complexity of shared resources, and which is also completely scalable with regard to ports, would therefore be advantageous.

SUMMARY OF THE INVENTION

It is an object of some aspects of the present invention to provide a method and apparatus for storing data via a plurality of ports.

In a preferred embodiment of the present invention, a storage system comprises a plurality of ports coupled to one or more logical units formed in physical media. One or more hosts are coupled to the storage system, and the hosts convey commands, typically data reads or writes, to the logical units via the ports. Each port is configured to have a number of command queues, the number of queues corresponding to the number of logical units in the system. Each port, on receiving commands from the hosts, directs the commands to its appropriate queue, according the logical unit to which the command is directed. Each port converts the commands to instructions for the current physical media of the logical units, and transfers the instructions to the physical media. By configuring each port to have a number of command queues equal to the number of logical units, bottlenecks occurring because of shared resources used by prior art systems are obviated. Since each port is configured with its own command queues the storage system is completely scalable with respect to numbers of ports. Furthermore, order of the commands to each logical unit is inherently maintained.

In some preferred embodiments of the present invention, the storage system comprises a coupling system, such as a switch or a bus, between the one or more hosts and the ports. The coupling system receives the commands from the one or more hosts, and conveys the commands to the correct ports. The ports direct the commands to the port command queues as described above.

In some preferred embodiments of the present invention, the logical units are coupled to one or more caches. The caches receive the instructions from the ports and temporarily store the instructions, before implementing them within the caches or directing them to the physical media comprising the logical units.

The main advantage of preferred embodiments of the present invention lays in the parallel handling of queues that consumes very few management resources, and allows full scalability with respect to the number of ports.

There is therefore provided, according to a preferred embodiment of the present invention, a storage system, including:

one or more data storage logical units (LUs) consisting of respective physical media, the one or more LUs being adapted to receive commands and responsively to the commands to store and recall data; and a plurality of ports, each port being adapted to maintain a respective LU command queue for each of the LUs, such that upon receiving a command directed to one of the LUs, the port places the received command in the respective LU command queue, converts the received command to one or more converted commands at least some of which are directed to the physical media of the one of the LUs, and conveys the at least some converted commands to the physical media in an order determined by the respective LU command queue.

The command is preferably included in one of a plurality of strings of commands each directed to a respective one of the ports, and each of the ports is coupled to receive the respective string of commands directed thereto.

Preferably, the plurality of ports includes a first port and a second port, and the first port conveys a first string of the at least some converted commands in a first order to the physical media, and the second port conveys a second string of the at least some converted commands in a second order to the physical media, and the physical media is preferably adapted to receive the first string and to store and recall the data in response to the first order, and to receive the second string and to store and recall the data in response to the second order.

The command preferably includes a request according to a small computer system interface (SCSI) protocol, and the storage system is preferably operative according to the SCSI protocol.

Preferably, each of the ports includes a respective central processing unit (CPU) which operates each of the ports substantially independently.

The command is preferably included in one of one or more strings of commands, each command of each string being directed via one of the ports to a respective one of the LUs, and the storage system preferably includes a coupling which:

receives the commands included in the one or more strings, sorts the commands according to the ports via which the commands are directed, and conveys the commands to the ports to which the commands are directed.

Preferably, the received command includes a write command to store a data string from a host to the physical media, and the one or more converted commands include instructions to the host to convey the data string to the physical media via the port, and the port is preferably adapted to convey the instructions to the host.

The received command preferably includes a read command from a host to read a data string from the physical media, and the one or more converted commands preferably include instructions to convey the data string via the port to the host.

Preferably, the physical media include the data, and the port is adapted to track changes of location of the data within the physical media.

There is further provided, according to a preferred embodiment of the present invention, a method for processing data, including:

storing and recalling data in one or more data storage logical units (LUs), consisting of respective physical media, responsively to commands; and configuring in each of a plurality of ports a respective LU command queue for each of the LUs, such that upon receiving a command directed to one of the LUs, the port places the received command in the respective LU command queue, converts the received command to one or more converted commands at least some of which are directed to the physical media of the one of the LUs, and conveys the at least some converted commands to the physical media in an order determined by the respective LU command queue.

Preferably, the command is included in one of a plurality of strings of commands each directed to a respective one of the ports, and the method preferably includes coupling each of the ports to receive the respective string of commands directed thereto.

Preferably, the plurality of ports includes a first port and a second port, and the method further includes:

conveying from the first port a first string of the at least some converted commands in a first order to the physical media;

conveying from the second port a second string of the at least some converted commands in a second order to the physical media;

and wherein storing and recalling the data preferably includes, at the physical media:

receiving the first string and storing and recalling the data in response to the first order; and receiving the second string and storing and recalling the data in response to the second order.

Preferably, the command includes a request according to a small computer system interface (SCSI) protocol, and the plurality of ports are included in a storage system operative according to the SCSI protocol. Further preferably, each of the plurality of ports operates substantially independently of other ports comprised in the plurality.

The command is preferably included in one of one or more strings of commands, each command of each string being directed via one of the ports to a respective one of the LUs, the method preferably including:

receiving the commands included in the one or more strings;

sorting the commands according to the ports via which the commands are directed; and conveying the commands to the ports to which the commands are directed.

Preferably, the received command includes a write command to store a data string from a host to the physical media, and the one or more converted commands include instructions to the host to convey the data string to the physical media via the port, and the port is adapted to convey the instructions to the host.

Preferably, the received command includes a read command from a host to read a data string from the physical media, and wherein the one or more converted commands include instructions to convey the data string via the port to the host.

Preferably, the physical media include the data, and the method includes tracking at the port changes of location of the data within the physical media.

The present invention will be more fully understood from the following detailed description of the preferred embodiments thereof, taken together with the drawings, a brief description of which follows.

DETAILED DESCRIPTION OF PREFERRED EMBODIMENTS

Figure 1:
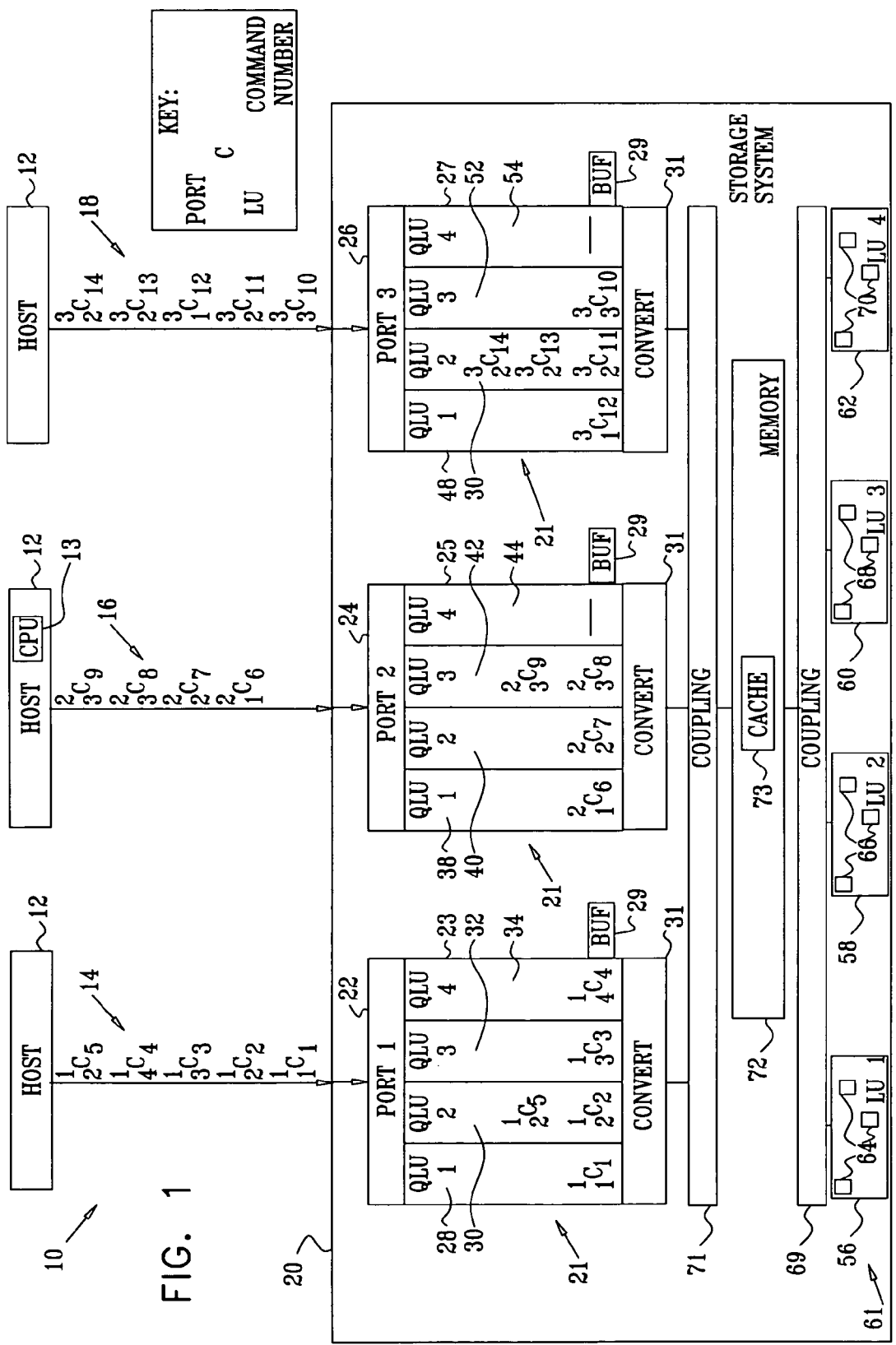
FIG. 1 is a schematic illustration of one or more hosts coupled to a storage system, according to a preferred embodiment of the present invention.

Reference is now made to FIG. 1, which is a schematic illustration of one or more hosts 12 coupled to a storage system 20 in an arrangement 10, according to a preferred embodiment of the present invention. The one or more hosts 12, herein by way of example assumed to be three hosts 12, operated by a central processing unit (CPU) 13, issue requests, also herein termed commands and described in further detail below, to storage system 20. The requests typically comprise commands to read data from or write data to system 20. Storage system 20 comprises one or more data storage logical units (LUs), each having a respective logical unit number (LUN). Preferably, hosts 12 and system 20 communicate by a standard data transfer protocol, herein, by way of example, assumed to be a small computer system interface (SCSI) protocol. Alternatively, hosts 12 and system 20 may communicate by any other suitable data transfer means.

By way of example, storage system 20 is assumed to comprise four LUs 56, 58, 60, and 62, also respectively referred to herein as LU1, LU2, LU3, and LU4, and generically as LUs 61. Each LU comprises one or more relatively slow access time non-volatile physical media, such as disks, wherein data may be stored. Herein LU1, LU2, LU3, and LU4, are assumed to respectively comprise media 64, 66, 68, and 70. While herein media 64, 66, 68, and 70 are assumed for clarity, and by way of example, to comprise separate entities, it will be understood that in general some or all of media 64, 66, 68, and 70 may comprise at least some of the same physical media. For example, media 64, 66, 68, and 70 may comprise one disk or 100 disks, so that data associated with LU1, LU2, LU3, and LU4, is all on the one disk, or is spread over the 100 disks. It will also be understood that the media associated with a specific LU may change with time. For example, media 64 may at different times comprise one disk, more than one disk, and part of a disk.

The LUs are coupled to one or more relatively fast access time memories 72 in which one or more caches 73 are configured. The coupling between the LUs and the memories is preferably via a coupling 69, which typically comprises a bus and/or a switch.

Storage system 20 comprises a plurality of physical ports via which the requests from hosts 12 are conveyed to LUs 61. Herein, by way of example, storage system 20 is assumed to comprise three ports 22, 24, and 26, also referred to herein as port 1, port 2 and port 3, but it will be understood that the storage system may comprise substantially any plurality of ports. The ports are coupled to the one or more caches 73 by a coupling 71, generally similar to coupling 69. Each port comprises a buffer 29 for data storage. Each port also comprises a respective memory 23, 25, 27, each of which preferably comprises one or more conversion tables 31. The port uses tables 31 to convert logical data in a received command to data suitable for the physical media to which the command is directed. Alternatively, each port uses a table equivalent, such as one or more functions, for converting to the data suitable for the physical media. The ports are configured to update conversion tables 31 and/or table equivalents as data of each specific LU changes location within the physical media of the LU. The functions of the data storage and conversion are described in more detail below.

Each memory is configured to have its own set of command queues, equal in number to the number of LUs. Each command queue is directed to a specific LU. Thus, port 1 comprises command queues 28, 30, 32, and 34, port 2 comprises command queues 38, 40, 42, and 44, and port 3 comprises command queues, 48, 50, 52 and 54. Command queues 28, 38, and 48, herein also termed QLU1, are directed to LU1; command queues 30, 40, and 50, herein also termed QLU2, are directed to LU2; command queues 32, 42, and 52, herein also termed QLU3, are directed to LU3; and command queues 34, 44, and 54, herein also termed QLU4, are directed to LU4. Preferably, each port of system 20 comprises a generally similar central processing unit (CPU) 21 for independently controlling entry and exit of commands to and from the command queues of the port, and one or more of these CPUs may also be used to control the overall operation of system 20. Alternatively or additionally, system 20 comprises a CPU separate from the ports, which, possibly together with one or more of CPUs 21 of the ports, controls the overall operation of system 20, so that entry and exit of commands to and from the command queues of the ports is performed independently for each port.

Hosts 12 direct commands via each port 1, port 2 and port 3 to LU1, LU2, LU3, and LU4. A convention used herein for each command in arrangement 10 is:

$$^p_L C_n,$$

where
p is the port number via which command C is being transferred;
L is the LU to which command C is directed; and
n is a command number.

Thus, $$^2_3 C_8$$

is the eighth command issued by hosts 12, and the command is directed to LU3 via port 2.

Hosts 12 issue strings of commands 14, 16, and 18 respectively via ports 1, 2, and 3. String 14 comprises commands $$^1_1 C_1, ^1_2 C_2, ^1_3 C_3, ^1_4 C_4, ^1_2 C_5,$$

string 16 comprises commands $$^2_1 C_6, ^2_2 C_7, ^2_3 C_8, ^2_4 C_9,$$

and string 18 comprises commands $$^3_3 C_{10}, ^3_2 C_{11}, ^3_1 C_{12}, ^3_2 C_{13}, ^3_2 C_{14}.$$

Port 1 allocates the commands of string 14 to its respective command queues, according to the LU to which the command is directed. Thus, $$^1_1 C_1$$

is allocated to QLU1;

$$^1_2 C_2$$

is allocated to QLU2;

$$^1_3 C_3$$

is allocated to QLU3;

$$^1_4 C_4$$

is allocated to QLU4; and $$^1_2 C_5$$

is allocated to QLU2.

The commands of strings 16 and 18 are allocated as follows.

String 16 in port 2:

$$^2_1 C_6$$

is allocated to QLU1;

$$^2_2 C_7$$

is allocated to QLU2;

$$_3^2C_8$$

is allocated to QLU3; and $$_3^2C_9$$

is allocated to QLU3.
String 18 in port 3:

$$_3^3C_{10}$$

is allocated to QLU3;

$$_2^3C_{11}$$

is allocated to QLU2;

$$_1^3C_{12}$$

is allocated to QLU1;

$$_2^3C_{13}$$

is allocated to QLU2; and $$_2^3C_{14}$$

is allocated to QLU2.

FIG. 1 illustrates the commands of strings 14, 16, and 18 after they have been distributed within the queues of their ports. It will be appreciated by inspection of FIG. 1 that any order of the commands to a specific LU via a specific port, as is originally in the string to the port, is maintained by the queues of the ports. Thus, in port 1 command $$_2^1C_5$$

is positioned in QLU2 after command $$_2^1C_2;$$

in port 2 command $$_3^2C_9$$

is positioned in QLU3 after command $$_3^2C_8;$$

and in port 3 commands $$_2^3C_{11}, _2^3C_{13}, \text{ and } _2^3C_{14}$$

are positioned in that order in QLU2.

Each of the command queues is preferably operated as a first-in-first-out (FIFO) memory, most preferably substantially independently of each other. On entry to the queues, each command is placed in its respective queues in substantially the same form as it arrives at the port. As each command reaches the end of its respective queue, the port reads and acts on the command by, inter alia, converting the commands to instructions and/or data. The resulting instructions and/or data are typically conveyed to the corresponding physical media of the LU of the queue, via caches 73, although, according to the type of received command, at least part of the instructions and/or data may be conveyed to other entities of arrangement 10, such as host 12. The instructions and/or data are executed at their destination. The resulting instructions and/or data are hereinbelow, in the specification and in the claims, referred to as converted commands, having a symbol $$[_L^p C_n].$$

Thus, for the example described above, media 66 of LU2 receives converted commands $$[_2^1C_2], [_2^1C_5]$$

from port 1, $$[_2^2C_7]$$

from port 2, and $$[_2^3C_{11}], [_2^3C_{13}], \text{ and } [_2^3C_{14}]$$

from port 3. The order of $$[_2^1C_2], [_2^1C_5]$$

received by the media of LU2 corresponds with the command order $$_2^1C_2, _2^1C_5$$

received by port 1. Similarly, the order of converted commands $$[_2^3C_{11}], [_2^3C_{13}], \text{ and } [_2^3C_{14}]$$

received by the media of LU2 correspond with commands $$_2^3C_{11}, _2^3C_{13}, \text{ and } _2^3C_{14}$$

received by port 3. It will be appreciated that while the order of converted commands from a specific port is maintained, the order between ports may change. Thus, some examples of orders of converted commands received by media 66 are:

$$[_2^1C_2], [_2^3C_{11}], [_2^1C_5], [_2^2C_7], [_2^3C_{13}], [_2^3C_{14}];$$

$$[_2^3C_{11}], [_2^1C_2], [_2^1C_5], [_2^3C_{13}], [_2^2C_7], [_2^3C_{14}]; \text{ and}$$

$$[_2^2C_7], [_2^1C_2], [_2^3C_{11}], [_2^3C_{13}], [_2^1C_5], [_2^3C_{14}].$$

Prior art storage systems typically use multiple ports, but require significant management resources to convey commands or converted commands to the correct LUs or corresponding physical media, while maintaining necessary order of commands or instructions. Furthermore, such multiple ports are not scalable, since the increase in management resources needed, as the number of ports increases, is far from linear.

Since each port of system 20 is configured with its own command queues the storage system is substantially completely scalable with respect to numbers of ports. Furthermore, order of the commands to each logical unit is inherently maintained.

It will be appreciated that each command queue is managed substantially independently of any other command queue, and such management is performed at the port level. This is true regardless of the type of commands, even where such commands require some form of synchronization. Such is the case, for example, for SCSI "Persistent Reserve Out" commands, which request service actions that reserve a logical unit for exclusive or shared use. However, while the Persistent Reserve Out command may require action reserving a particular LU, it will be understood that such commands, or others which also require action of a specific LU, do not affect the overall advantages of operation of system 20, since the overwhelming majority of commands typically executed in such a system are read and write commands.

Figure 2:
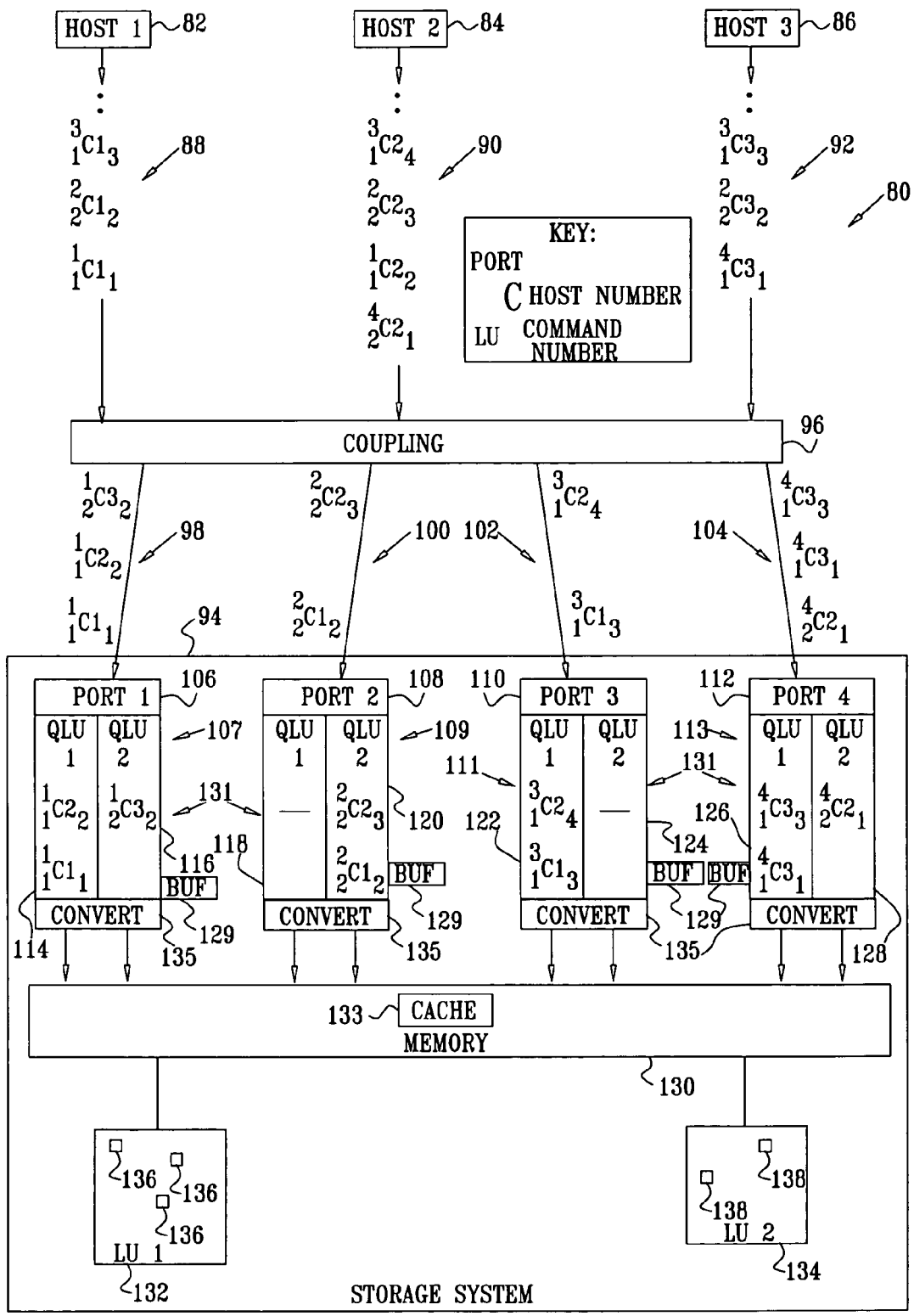
FIG. 2 is a schematic illustration of a plurality of hosts coupled to an alternative storage system, according to an alternative preferred embodiment of the present invention.

FIG. 2 is a schematic illustration of a plurality of hosts coupled to a storage system 94 in an arrangement 80, according to an alternative preferred embodiment of the present invention. Arrangement 80 functions generally as arrangement 10, except for differences described hereinbelow. Arrangement 80 comprises, by way of example, three hosts 82, 84, and 86, also referred to herein as host 1, host 2, and host 3, which respectively issue strings of commands 88, 90, and 92, and which are operated by separate CPUs.

A convention used herein for each command and the converted commands generated by the command, in arrangement 80 is:

$${}^p_L CN_n,$$

for a command, where N is the number of the host issuing the command, and p, L, and n are as defined above with reference to arrangement 10; and where $$[{}^p_L CN_n]$$

represents the converted commands generated in the port by $$ {}^p_L CN_n.$$

Arrangement 80 comprises a coupling 96 between hosts 1, 2, and 3, and storage system 94. Coupling 96 typically comprises a bus or a switch, but may comprise substantially any suitable method that is capable of transferring commands such as strings 88, 90, 92 between hosts 1, 2, 3 and storage system 94, including wired and/or wireless coupling methods. In some preferred embodiments of the present invention, coupling 96 is configured within system 94; alternatively, coupling 96 is separate from system 94.

Storage system 94 comprises two LUs, LU 132, and LU 134, also referred to as LU1 and LU2, formed in respective physical media 136 and 138. System 94 also comprises four ports 106, 108, 110, and 112, also referred to herein as port 1, port 2, port 3, and port 4, each port having a respective memory 107, 109, 111, and 113. Each port has a data storage buffer 129. Each port also preferably comprises one or more conversion tables 135, or alternatively another method for conversion of received commands, substantially as described above for arrangement 10. Thus, buffers 129 and tables 135 respectively correspond to buffers 29 and tables 31 of system 20. Each port is configured to have two command queues, corresponding to the number of LUs. Thus, port 1 comprises command queues 114 and 116; port 2 comprises command queues 118 and 120; port 3 comprises command queues 122 and 124; and port 4 comprises command queues 126 and 128. Command queues 114, 118, 122, and 126 are also termed QLU1 and are directed to LU1; command queues 116, 120, 124, and 128 are also termed QLU2 and are directed to LU2.

System 94 also comprises a fast access memory 130 which is used as a cache by the system, as described in more detail below.

Preferably, each port of system 94 comprises a respective CPU 131, which controls entry and exit of commands to the command queues of the port. Alternatively or additionally, system 94 comprises a CPU separate from the ports, which, possibly together with one or more of CPUs 131 of the ports, controls the overall operation of system 94, so that entry and exit of commands to the command queues of the ports is performed independently for each port.

Host 1 issues command string 88 comprising commands $$ {}^1_1Cl_1, {}^2_2Cl_2, \text{ and } {}^3_1Cl_3;$$

host 2 issues command string 90 comprising commands $$ {}^4_2C2_1, {}^1_1C2_2, {}^2_2C2_3, {}^3_1C2_4;$$

and host 3 issues command string 92 comprising commands $$ {}^4_1C3_1, {}^1_2C3_2, {}^4_1C3_3.$$

The commands are received by coupling 96, which sorts the commands according to the ports of system 94 via which the commands are directed, and conveys strings of sorted commands to the respective ports. Thus, coupling 96 generates four sorted command strings: string 98 comprising $$ {}^1_1Cl_1, {}^1_1C2_2, {}^1_2C3_2,$$

directed to port 1; string 100 comprising $$ {}^2_2Cl_2, {}^2_2C2_3,$$

directed to port 2; string 102 comprising $$ {}^3_1Cl_3, {}^3_1C2_4,$$

directed to port 3; and string 104 comprising $$^4_2C2_1, ^4_1C3_1, ^4_1C3_3,$$

directed to port 4.

As for system 20, the ports of system 94 are configured to update conversion tables 135 and/or table equivalents, so as to track changes of location of the data of each specific LU within the physical media of the LU. Also as for system 20, each port of system 94 sorts the commands it receives into its command queues QLU1 and QLU2, according to the LU to which the commands are directed. Thus, for port 1, QLU1 comprises $$^1_1C1_1, ^1_1C2_2,$$

and QLU2 comprises $$^1_2C3_2;$$

for port 2, QLU1 is empty and QLU2 comprises $$^2_2C1_2, ^2_2C2_3;$$

for port 3, QLU1 comprises $$^3_1C1_3, ^3_1C2_4,$$

and QLU2 is empty; and for port 4, QLU1 comprises $$^4_1C3_1, ^4_1C3_3$$

and QLU2 comprises $$^4_2C2_1.$$

Each of the command queues is preferably operated as a substantially independent FIFO memory. The converted commands derived from each command are conveyed to the physical media corresponding to the LU of the queue, via memory 130, substantially as described above with respect to arrangement 10. Memory 130 is most preferably configured as one or more caches 133 for LU1 and LU2. For the commands shown in FIG. 2, an example of the converted commands received by the physical media corresponding to LU2 is:

$$[^4_2C2_1], [^2_2C1_2], [^2_2C2_3], [^1_2C3_2].$$

Figure 3:
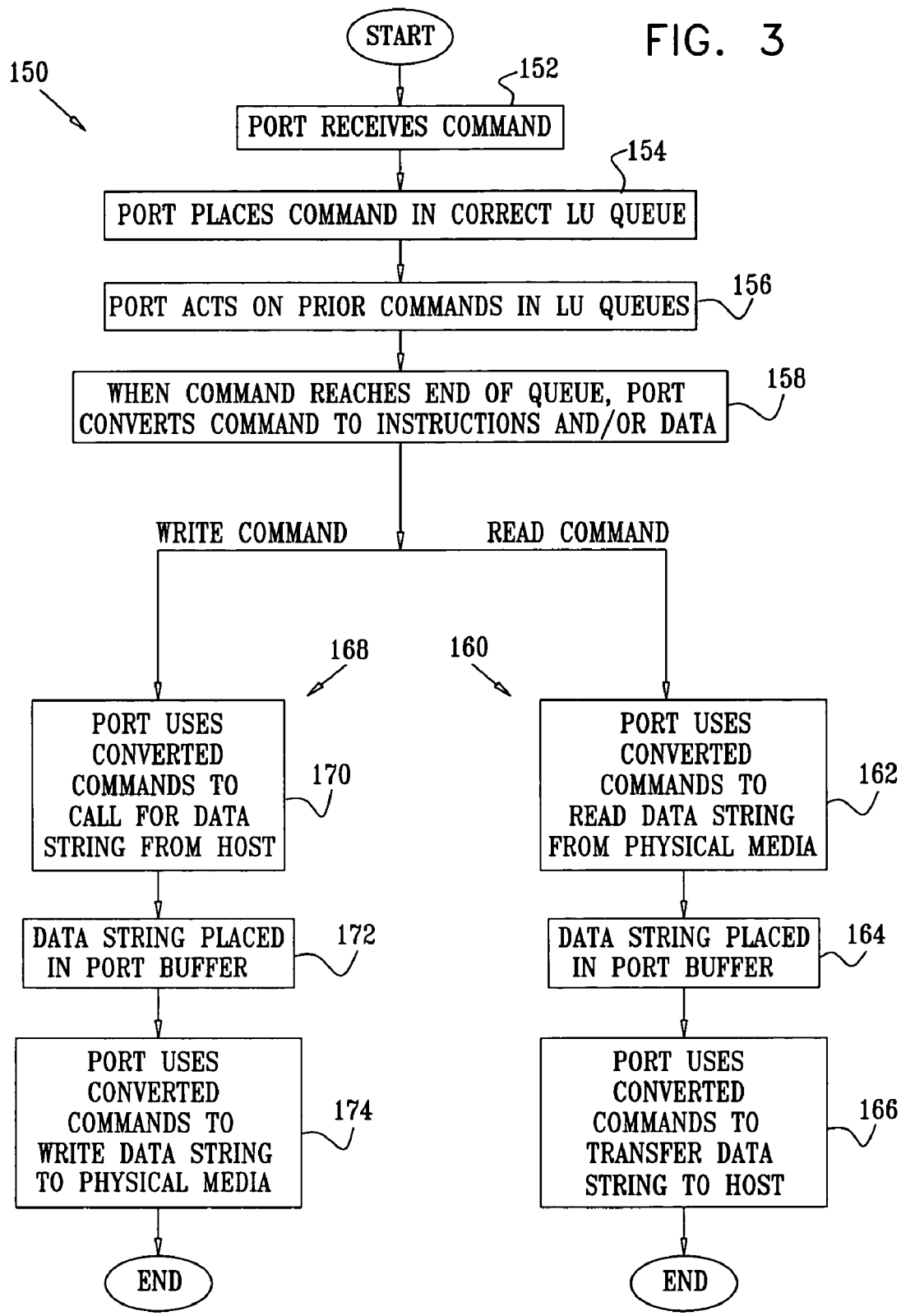
FIG. 3 is a flowchart showing steps performed by a port of the systems of FIG. 1 or FIG. 2, according to a preferred embodiment of the present invention.

FIG. 3 is a flowchart 150 showing steps performed by a port of system 20 or system 94, according to a preferred embodiment of the present invention. Flowchart 150 describes implementation by port 1 of system 94 of a read or write command, and those skilled in the art will be able to adapt the flowchart, mutatis mutandis, for other commands.

In initial steps 152 and 154, port 1 receives the command and places the command in the correct queue in the port. In a third step 156, the port acts on prior commands in the LU queues.

In a fourth step 158, performed by port 1 when the command reaches the end of its queue, the port converts information in the command, such as a logical block address and a length of a data string, to converted commands for the physical media comprising the LU to which the command is directed. Typically the conversion uses one or more tables 135, and/or one or more functions, as described above. The conversion performed by the port also determines, from the command, if the command is a read command, in which case a path 160 is followed, or a write command, in which case a path 168 is followed.

If the command is a read command, in a step 162 the port uses the converted commands determined in step 158 to read a data string from a physical address of the physical media. In a step 164 the data string is placed in buffer 129. In a final step 166, the port uses the converted commands to transfer the data string from the buffer to the appropriate host.

If the command is a write command, the converted commands determined in step 158 include instructions that enable the port, in a step 170, to call a data string from the host. In a step 172 the port stores the data string in buffer 129. In a final step 174, the port uses the converted commands to write the data string to an appropriate physical address of the physical media.

By distributing the conversion operations described hereinabove over the separate ports of systems 20 and 94, the efficiency of such conversions increases compared to performing the conversions at one port or storage node. Furthermore, distribution of the conversion operations enables full scalability of the ports.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for processing data, comprising:
    storing and recalling data in a plurality of data storage logical units (LUs), comprising a plurality of physical media, responsively to commands; and
    configuring in each of a plurality of ports a plurality of LU command queues, each of the plurality of LU command queues corresponding to a respective one of the LUs, such that upon receiving a command directed to a specific LU at a given port, the given port places the received command in the LU command queue for the specific LU, converts the received command to one or more converted commands at least some of which are directed to the plurality of the physical media of the specific LU, and conveys the at least some converted commands to the plurality of the physical media in an order determined by the LU command queue, so that an order of arrival of the conveyed converted commands at the specific LU complies with the order of arrival of the received command at the given port, and wherein concurrent commands from different ports arrive at the specific LU in an arbitrary order of arrival.

2. The method according to claim 1, wherein the command is comprised in one of a plurality of strings of commands each directed to a respective one of the ports, and further comprising coupling each of the ports to receive the respective string of commands directed thereto.

3. The method according to claim 1, wherein the plurality of ports comprises a first port and a second port, the method further comprising:
conveying from the first port a first string of the at least some converted commands in a first order to the physical media; and
conveying from the second port a second string of the at least some converted commands in a second order to the physical media;
wherein storing and recalling the data comprises, at the physical media:
receiving the first string and storing and recalling the data in response to the first order; and
receiving the second string and storing and recalling the data in response to the second order.

4. The method according to claim 1, wherein the command comprises a request according to a small computer system interface (SCSI) protocol, and wherein the plurality of ports are comprised in a storage system operative according to the SCSI protocol.

5. The method according to claim 1, wherein each of the plurality of ports operates substantially independently of other ports comprised in the plurality.

6. The method according to claim 1, wherein the command is comprised in one of one or more strings of commands, each command of each string being directed via one of the ports to a respective one of the LUs, and comprising:
receiving the commands comprised in the one or more strings;
sorting the commands according to the ports to which the commands are directed; and
conveying the commands to the ports to which the commands are directed.

7. The method according to claim 1, wherein the received command comprises a write command to store a data string from a host to the plurality of the physical media, wherein the one or more converted commands comprise instructions to the host to convey the data string to the plurality of the physical media via the port, and wherein the port is adapted to convey the instructions to the host.

8. The method according to claim 1, wherein the received command comprises a read command from a host to read a data string from the plurality of the physical media, and wherein the one or more converted commands comprise instructions to convey the data string via the given port to the host.

9. The method according to claim 1, wherein the plurality of the physical media comprise the data, and comprising tracking at the given port changes of location of the data within the plurality of the physical media.

10. The method according to claim 1, wherein the plurality of the physical media comprise a plurality of slow access time non-volatile physical media.

11. The method according to claim 1, wherein the plurality of the physical media comprise a plurality of slow access time non-volatile physical media.

12. The method according to claim 1, wherein a particular physical media of the plurality of the physical medial changes over time.

13. The method according to claim 1, wherein each data storage logical unit (LU) is distributed across a plural subset of the plurality of the physical media.

14. The method according to claim 1, wherein the given port converting the received command to the one or more converted commands converts a logical block address and a length of that string included in the received command; and
wherein the converting operation performed by the port also determines if the command is one of a read command and a write command.

15. A storage system, comprising:
means for storing and recalling data in a plurality of data storage logical units (LUs), comprising a plurality of physical media, responsively to commands; and
means for configuring in each of a plurality of ports a plurality of LU command queues, each of the plurality of LU command queues corresponding to a respective one of the LUs, such that upon receiving a command directed to a specific LU at a given port, the given port places the received command in the LU command queue for the specific LU, converts the received command to one or more converted commands at least some of which are directed to the plurality of the physical media of the specific LU, and conveys the at least some converted commands to the plurality of the physical media in an order determined by the LU command queue, so that an order of arrival of the conveyed converted commands at the specific LU complies with the order of arrival of the received command at the given port, and wherein concurrent commands from different ports arrive at the specific LU in an arbitrary order of arrival.

16. The storage system according to claim 15, wherein the plurality of ports comprises a first port and a second port, the storage system further comprising:
means for conveying from the first port a first string of the at least some converted commands in a first order to the physical media; and
means for conveying from the second port a second string of the at least some converted commands in a second order to the physical media;
wherein the means for storing and recalling the data comprises, at the physical media:
means for receiving the first string and storing and recalling the data in response to the first order; and
means for receiving the second string and storing and recalling the data in response to the second order.

17. The storage system according to claim 15, wherein the command is comprised in one of one or more strings of commands, each command of each string being directed via one of the ports to a respective one of the LUs, and comprising:
means for receiving the commands comprised in the one or more strings;
means for sorting the commands according to the ports to which the commands are directed; and
means for conveying the commands to the ports to which the commands are directed.

18. A storage medium comprising instructions that, when executed by a processor, cause the processor to perform a method for processing data comprising the steps of:
storing and recalling data in a plurality of data storage logical units (LUs), comprising a plurality of physical media, responsively to commands; and
configuring in each of a plurality of ports a plurality of LU command queues, each of the plurality of LU command queues corresponding to a respective one of the LUs, such that upon receiving a command directed to a specific LU at a given port, the given port places the received command in the LU command queue for the specific LU, converts the received command to one or more converted commands at least some of which are directed to the plurality of the physical media of the specific LU, and conveys the at least some converted commands to the plurality of the physical media in an order determined by the LU command queue, so that an order of arrival of the conveyed converted commands at the specific LU complies with the order of arrival of the received command at the given port, and wherein concurrent commands from different ports arrive at the specific LU in an arbitrary order of arrival.

19. The storage medium according to claim 18, wherein the plurality of ports comprises a first port and a second port, the storage medium further comprising instructions that cause the processor to perform the steps of:

conveying from the first port a first string of the at least some converted commands in a first order to the physical media; and conveying from the second port a second string of the at least some converted commands in a second order to the physical media;

wherein the means for storing and recalling the data comprises, at the physical media:

receiving the first string and storing and recalling the data in response to the first order; and receiving the second string and storing and recalling the data in response to the second order.

20. The storage medium according to claim 18, wherein the command is comprised in one of one or more strings of commands, each command of each string being directed via one of the ports to a respective one of the LUs, the storage medium further comprising instructions that cause the processor to perform the steps of:

receiving the commands comprised in the one or more strings;

sorting the commands according to the ports to which the commands are directed; and conveying the commands to the ports to which the commands are directed.

* * * * *